(12) United States Patent
Kobayashi et al.

(10) Patent No.: US 7,177,255 B2
(45) Date of Patent: *Feb. 13, 2007

(54) PROCESS FOR MANUFACTURING AN OPTICAL DISK WITH RECORDED SUB-DATA

(75) Inventors: Seiji Kobayashi, Kanagawa (JP); Toshihiro Fujiki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/926,049

(22) Filed: Aug. 26, 2004

(65) Prior Publication Data

US 2005/0018594 A1 Jan. 27, 2005

Related U.S. Application Data

(62) Division of application No. 09/611,597, filed on Jul. 7, 2000, now Pat. No. 6,963,529.

(30) Foreign Application Priority Data

Jul. 14, 1999 (JP) .................. 11-199896

(51) Int. Cl.
G11B 7/004 (2006.01)
G11B 7/007 (2006.01)

(52) U.S. Cl. .............. 369/59.24; 369/59.25; 369/59.11

(58) Field of Classification Search ............ 369/47.21, 369/47.22, 59.11, 59.24, 59.25, 47.19
See application file for complete search history.

(56) References Cited

U.S. PATENT DOCUMENTS 5,570,339 A * 10/1996 Nagano .................. 369/275.3
5,572,507 A 11/1996 Ozaki et al. ............. 369/275.4
5,615,193 A 3/1997 Kobayashi et al. ........... 369/59
5,661,707 A 8/1997 Matsui .................. 369/59
5,809,003 A * 9/1998 Taira et al. ............. 369/275.1

(Continued)

FOREIGN PATENT DOCUMENTS

| EP | 0 545 472 | 6/1993 |
|---|---|---|
| EP | 0 635 828 | 1/1995 |
| EP | 0 703 576 | 3/1996 |
| EP | 0 866 454 | 9/1998 |
| EP | 0 936 610 | 8/1999 |

(Continued)

OTHER PUBLICATIONS

Machine translation of JP 10-269577.*
PAJ abstract of JP 02-252334.*
PAJ abstract of JP 62-030435.*
Machine translation and English abstract of JP 10-269577.*

*Primary Examiner*—Andrea Wellington
*Assistant Examiner*—Nathan Danielsen
(74) *Attorney, Agent, or Firm*—Oblon, Spivak, McClelland, Maier & Neustadt, P.C.

(57) ABSTRACT

An information recording apparatus, an information recording method, an information recording medium, an information reproducing apparatus and an information reproducing method by which in the case in which the present invention is applied to an optical disk system by, for example, a compact disk or the like and data or the like related to copyright is recorded by partial change of a pit shape or the like, the data can be reproduced with certainty without repeatedly recording the data. With regard to a defect having a size by which at least main data can be reproduced correctly, 1 bit of sub-data SB is allocated to a pit row or the like having a predetermined length or more such that the sub-data SB can be reproduced correctly.

9 Claims, 7 Drawing Sheets

U.S. PATENT DOCUMENTS

| | | | | |
|---|---|---|---|---|
| 5,867,475 | A | 2/1999 | Moriya et al. | 369/275.3 |
| 6,034,930 | A * | 3/2000 | Kitahara | 369/47.15 |
| 6,052,465 | A * | 4/2000 | Gotoh et al. | 369/53.21 |
| 6,078,552 | A * | 6/2000 | Yamamoto et al. | 369/47.51 |
| 6,331,969 | B1 * | 12/2001 | Kobayashi et al. | 369/275.3 |
| 6,483,792 | B1 * | 11/2002 | Yamamoto et al. | 369/59.12 |
| 6,587,948 | B1 * | 7/2003 | Inazawa et al. | 713/193 |
| 2004/0027980 | A1 * | 2/2004 | Sako et al. | 369/272 |
| 2004/0095866 | A1 * | 5/2004 | Morishima et al. | 369/59.24 |

FOREIGN PATENT DOCUMENTS

| | | |
|---|---|---|
| EP | 936610 A2 * | 8/1999 |
| EP | 0 980 069 | 2/2000 |
| EP | 1079381 A2 * | 2/2001 |
| JP | 62030435 A * | 2/1987 |
| JP | 02252334 A * | 10/1990 |
| JP | 10269577 A * | 10/1998 |
| JP | 11126426 A | 5/1999 |
| JP | 11-185258 | 7/1999 |

* cited by examiner

PROCESS FOR MANUFACTURING AN OPTICAL DISK WITH RECORDED SUB-DATA

CROSS-REFERENCE RELATED DOCUMENTS

The present application is a Divisional of U.S. Application Ser. No. 09/611,597, filed on Jul. 7, 2000 now U.S. Pat. No. 6,963,529, and in turn claims priority to JP11-199896, filed on Jul. 14, 1999, the entire contents of each of which are incorporated herein by reference.

BACKGROUND OF THE INVENTION

1. Field of the Invention

The present invention relates to an information recording apparatus, an information recording method, an information recording medium, an information reproducing apparatus and an information reproducing method and is applicable to an optical disk system by, for example, a compact disk or the like. According to the present invention, in the case in which with regard to a defect having a size by which at least main data can be reproduced correctly, by allocating 1 bit of sub-data to a pit row or the like having a predetermined length or more such that the sub-data can be reproduced correctly, when data or the like related to copyright is recorded by partial change of pit shape or the like, the data can be reproduced with certainty without repeatedly recording the data.

2. Description of the Related Art

Conventionally, in a compact disk, there are recorded signals utilized by the user such as audio signal, TOC (Table of Contents) and the like in a program area and a read-in area and there is formed an area of recording IFPI (International Federation of the Phonographic Industry) code on an inner peripheral side of the read-in area.

Here, IFPI code is a code capable of confirming maker, production site, disk number or the like by optical observation and in the case of a compact disk, illegal copy of pirated edition or the like can be discovered by confirming the code.

In the meantime, when a compact disk of illegal copy can be detected automatically by a compact disk player, it seems that various measures can be taken with regard to illegal copy of this kind and right of a copyright owner can be protected effectively.

In this case, although it is conceivable to detect illegal copy by utilizing IFPI code, in the case of IFPI code, the code is on the premise that the code can be confirmed by optical observation and accordingly, when there is constructed a constitution in which IFPI code can be confirmed by a compact disk player, the constitution of the compact disk player becomes complicated. Further, IFPI code per se can be forged since the code can be confirmed by optical observation and in this case, after all, illegal copy cannot be determined.

With regard thereto, as proposed, for example, Japanese Patent Application No. 288960/1997, Japanese Patent Application No. 34837/1997, Japanese Patent Application No. 332222/1998, Japanese Patent Application No. 371795/1998 and the like, when data or the like related to the copyright is recorded by partial change of pit shape such that no influence is effected in reproduction of audio signal, such an illegal copy can be detected with certainty.

However, in the case in which data or the like related to copyright is recorded by the partial change of the pit shape, there is conceivable a case in which the partial change of the shape is difficult to detect owing to a defect of the compact disk. Thereby, in the case of the method, the certainty needs to establish by repeatedly recording the same data.

SUMMARY OF THE INVENTION

The present invention has been carried out in consideration of the above-described point and in the case in which data or the like related to copyright is recorded by the partial change of the pit shape or the like, there are proposed an information reproducing apparatus and an information reproducing method capable of reproducing the data with certainty without repeatedly recording the data, an information recording medium applied to such an information reproducing apparatus and an information recording apparatus and an information recording method for forming the information recording medium.

In order to resolve such a problem, according to one aspect of the present invention, by applying the present invention to an information recording apparatus or an information recording method, with regard to a defect having a size by which at least main data can be reproduced correctly, there is generated a second modulating signal by allocating 1 bit of sub-data to a pit row or a mark row having a predetermined length or more such that the sub-data can be reproduced correctly.

Further, according to another aspect of the present invention, by applying the present invention to an information recording medium, with regard to a defect having a length by which main data can be reproduced correctly, 1 bit of sub-data is allocated to a pit row or a mark row having a predetermined length such that sub-data can be reproduced correctly.

Further, according to another aspect of the present invention, by applying the present invention to an information reproducing apparatus or an information reproducing method, sub-data recorded by a local change in a pit or a mark of a pit row or a mark row by repeating to integrate a sampling signal for a predetermined time period, is reproduced and an integrating time period in correspondence with 1 bit of the sub-data is set to a time period by which the sub-data can be recorded correctly with regard to a defect having a size by which at least main data can be reproduced correctly.

According to the constitution of another aspect of the present invention, by a partial change in a pit shape or the like, data or the like related to copyright is recorded and in the case in which, for example, there causes a small defect or the like to a degree which cannot be seen by the eye, the sub-data can be reproduced when the main data can be reproduced without repeatedly recording the sub-data.

Further, according to the constitution of another aspect of the present invention, by applying the present invention to the information recording medium, 1 bit of the sub-data is allocated to the pit row or the mark row having the predetermined length such that the sub-data can correctly be reproduced with regard to a defect having a length by which the main data can correctly be reproduced, thereby, the sub-data can correctly be reproduced without repeatedly recording the sub-data so far as the main data can be reproduced correctly.

Further, according to the constitution of another aspect of the present invention, by applying the present invention to the information reproducing apparatus or the information reproducing method, there is reproduced the sub-data recorded by the local change in the pit or the mark of the pit row or the mark row by repeating to integrate the sampling signal of the predetermined time period and the integrating time period in correspondence with 1 bit of the sub-data is set to the time period by which the main data can correctly be reproduced with regard to a defect having a size by which at least the main data can be reproduced correctly, thereby, the sub-data can be reproduced when the main data can be reproduced in the case in which, for example, there causes a small defect or the like to a degree which cannot be seen by the eye without repeatedly recording the sub-data.

DESCRIPTION OF THE PREFERRED EMBODIMENTS

A detailed description will be given of embodiments of the present invention pertinently in reference to the drawings as follows.

(1) Constitution of Embodiment

Figure 2:
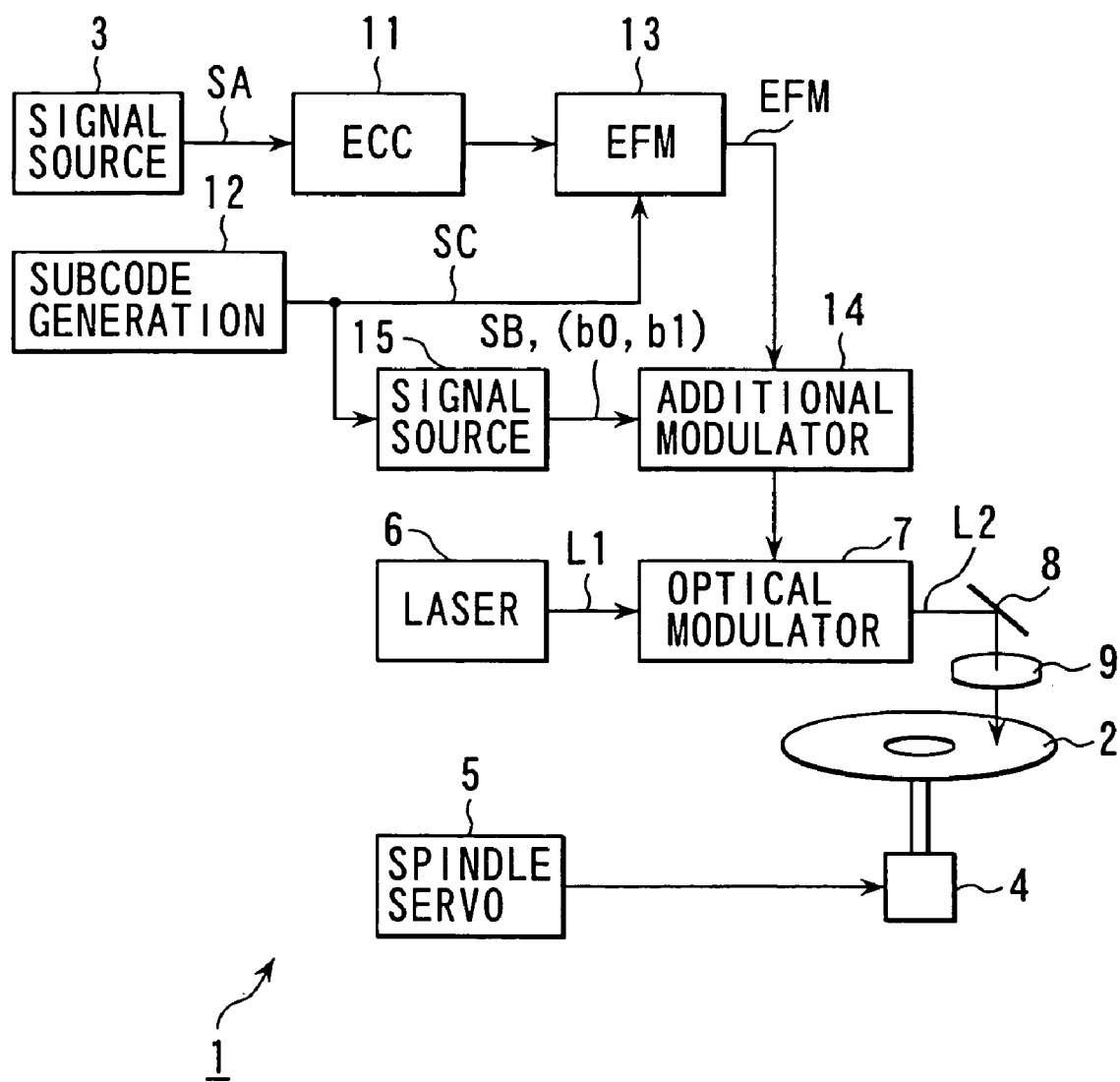
FIG. 2 is a block diagram showing the disk original exposure apparatus related to the additional modulating circuit of FIG. 1.

FIG. 2 is a block diagram showing a disk original exposure apparatus according to an embodiment of the present invention. According to a disk original exposure apparatus 1, a disk original 2 is exposed and audio data SA outputted from a signal source 3 is recorded. In steps of fabricating a compact disk, after developing the disk original 2, by carrying out an electrocasting process, a mother disk is formed and a stamper is formed from the mother disk. Further, in the steps of fabricating the compact disk, a disk substrate is formed by the stamper formed in this way and a reflective film and a protective film are formed above the disk substrate to thereby form the compact disk.

That is, according to the disk original exposure apparatus 1, a spindle motor 4 drives to rotate the disk original 2 and FG signal FG a signal level of which rises at every predetermined rotational angle is outputted from an FG signal generating circuit held at a bottom portion thereof. A spindle servo circuit 5 drives the spindle motor 4 such that frequency of the FG signal FG becomes a predetermined frequency to thereby drive to rotate the disk original 2 under constant line speed.

A laser 6 is constituted by a gas laser or the like and emits laser beam L1 for exposing the disk original.

An optical modulator 7 is an AOD (Acoustic Optical Deflector) constituted by an electro-acoustic optical element or the like for controlling an optical amount of the laser beam L1 emitted from the laser 6 by ON/OFF control in accordance with an optical modulation signal to thereby modulate the laser beam L1 by the optical modulation signal and emit the laser beam L1.

A mirror 8 emits laser beam L2 emitted from the optical modulator 7 by deflecting an optical path thereof. An object lens 9 focuses reflected light of the mirror 8 on a resist face of the disk original 2. The mirror 8 and the object lens 9 successively move in an outer peripheral direction of the disk original 2 in synchronism with rotation of the disk original 2 by a threading mechanism, not illustrated, to thereby displace an exposure position by the laser beam L2 successively to the outer peripheral direction of the disk original 2.

Thereby, according to the disk original exposure apparatus 1, in a state in which the disk original 2 is driven to rotate under the constant line speed condition, by moving the mirror 8 and the object lens 9, a track is formed in a spiral shape and a pit row in accordance with the audio data SA is formed on the track.

The signal source 3 is constituted by a digital audio tape recorder or the like and outputs the audio data SA recorded by the pit row. A sub code generating circuit 12 outputs sub code data SC including TOC information or the like prescribed by a standard with regard to the compact disk.

An ECC circuit 11 adds an error correction code to the audio data SA and thereafter subjects the audio data SA to an interleave processing to thereby enable to reproduce the audio data SA correctly even in the case in which a defect is caused in the compact disk. An EFM circuit 13 carries out 8–14 modulation by adding the sub code data SC outputted from the sub code generating circuit 12 to the audio data SA, error correction code outputted from the ECC circuit 11 and generates EFM signal EFM by interposing a synchronizing signal or the like to a result of the modulation. Thereby, the EFM circuit 13 constitutes first modulating signal generating means for generating the EFM signal EFM which is a first modulating signal in correspondence with the pit row or a mark row.

According to a conventional disk original exposure apparatus used in fabricating a compact disk, the optical modulator 7 is driven directly by the EFM signal EFM generated in this way to thereby form the pit row by successively exposing the disk original 2 by ON/OFF control of the laser beam L1 in accordance with the signal level of the EFM signal EFM.

According to the disk original exposure apparatus 1, in an additional modulating circuit 14, the EFM signal EFM is further modulated by sub-data SB outputted from a signal source 15 to thereby generate the optical modulating signal SD to thereby record not only the audio data SA but also the second data SB on the disk original 2.

Here, the signal source 15 outputs a disk identifying code as the sub-data SB. The disk identifying code SB is data for identifying history and the like of the compact disk and is constituted by, for example, ID information, information related to manufacturing factory, manufacturing year, month and date, information for controlling copiable/noncopiable and the like which are set as inherent to each disk original. The signal source 15 outputs the disk identifying code SB by data of 2 bits comprising a higher side bit b0 and a lower side bit b1. Further, the signal source 15 outputs the disk identifying code SB by a long repetition period with the sub code data SC as a reference, that is, such that 1 block period of a time code in the sub code data SC constitutes the repetition period of the disk identifying code SB.

Here, according to the sub code data SC, the signal source 15 outputs 1 bit of the disk identifying code SB by

[bits/second] since 1 block period of the time code is prescribed to be 1/75 [second] by a standard and outputs the disk identifying code SB at transmitting speed of 150 [bits/second] in view of a total of the disk identifying code SB comprising 2 bits.

Here, in the case of a compact disk, it is determined by a standard to record by line speed of 1.2 through 1.4 [mm/second]. Thereby, when investigating the case of the slowest line speed of 1.2 [mm/second], the signal source 15 outputs the disk identifying code SB such that when converted in a track length in the disk original 2, a track length of 16 [mm] corresponds to 1 bit of the disk identifying code SB.

Thereby, according to the disk original exposure apparatus 1, with respect to an area having a track length of 16 [mm] formed on the disk original 2, the respective bits of the disk identifying code SB are dispersed and recorded by partial change of a pit having a predetermined length or more formed in the area.

Here, according to the compact disk, bit error by the defect or the like is subjected to error correction processing by an error correction code added to the audio data. Further, when the size of the defect or the like is large and bit error which is difficult to correct is caused, the audio signal which is a result of reproduction is subjected to erasure or interpolation processing. In the case of the compact disk, when a defect having a predetermined length or more is caused and a frequency of such an erasure or interpolation processing becomes high, any user feels skeptical with regard to the result of reproduction. That is, when such a defect having a predetermined length or more is caused, commercial value of the compact disk is significantly deteriorated.

That is, when a length of the defect deteriorating the commercial value in this way is designated by notation 11 and a length of the defect by which the audio data is difficult to reproduce correctly even by the error correction code is designated by notation 12, the length of 16 (mm) allocated with 1 bit of the disk identifying code SB is constituted such that a length of the length of 16 (mm) removed of the length 11 or 12, respectively, is a length by which the disk identifying code SB can be reproduced correctly by a predetermined error rate or smaller in constitution of a recording/reproducing system of the disk identifying code SB, mentioned later.

Thereby, according to the disk original exposure apparatus 1, even when a defect is caused, in the case in which the audio data SA which is main data can be reproduced correctly by the error correction code and in the case in which the audio data SA constituting the main data can be reproduced correctly to a degree of maintaining commercial value as the compact disk, such that the disk identifying code SB can also be reproduced correctly, the disk identifying code SB is recorded to allocate to a long distance on the compact disk and only in the case in which a large defect to a degree of losing the commercial value as the compact disk is caused, the disk identifying code SB is constituted too difficult to reproduce.

Further, according to the disk original exposure apparatus 1, the relationship is established even with regard to a CD-ROM which is an application product of the compact disk, thereby, in place of forming the compact disk by recording the audio data SA, the disk original exposure apparatus 1 is applicable also in forming a CD-ROM. Further, in the case of a CD-ROM, when the bit error is difficult to correct even by the error correction function of a CD-ROM intensified more than the compact disk, after all, in the data such as computer program is difficult to reproduce correctly, the commercial value is deteriorated and accordingly, only in such a case, the disk identifying code SB is difficult to reproduce.

Further, in the case in which there is caused a defect to a degree of being difficult to reproduce the disk identifying code SB correctly, the length of 16 [mm] is a length by which the defect can be detected sufficiently by optical observation. Thereby, the defect by which the disk identifying code SB is difficult to reproduce correctly can simply be discovered by optical inspection.

The additional modulating circuit 14 outputs the optical modulating signal SD by modulating the EFM signal EFM by the disk identifying code SB. At this occasion, the additional modulating circuit 14 modulates the EFM signal EFM by the disk identifying code SB such that with regard to a pit formed by the EFM signal EFM, the shape of the pit is locally changed and the local change effects no influence in reproduction of the audio data SA. Thereby, the additional modulating circuit 14 constitutes second modulating means for modulating the EFM signal EFM which is the first modulating signal by the disk identifying code SB which is sub-data.

Figure 1:
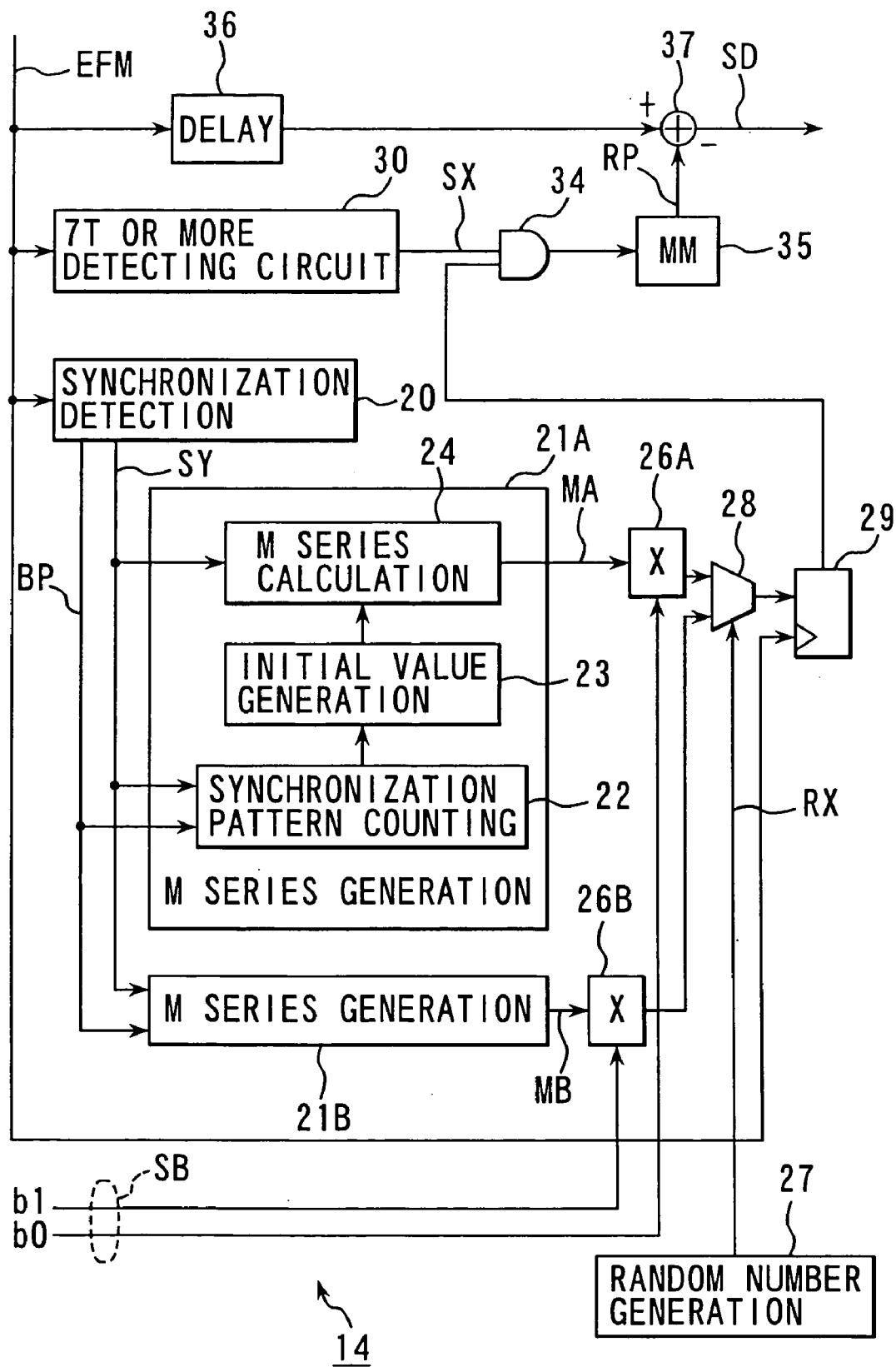
FIG. 1 is a block diagram showing an additional modulating circuit of a disk original exposure apparatus according to an embodiment of the present invention.

FIG. 1 is a block diagram showing a detailed constitution of the additional modulating circuit 14. The additional modulating circuit 14 inputs the EFM signal EFM to a PLL circuit, not illustrated, and reproduces channel clock of the EFM signal EFM by the PLL circuit. The additional modulating circuit 14 supplies respective circuit blocks with the channel clock as a reference of processing the EFM signal EFM.

A synchronization detecting circuit 20 outputs a synchronization detecting signal SY indicating frame boundary of the EFM signal EFM by detecting a synchronizing signal allocated to the EFM signal EFM by 1 frame unit (588 channel clock unit). Further, the synchronization detecting circuit 20 detects a boundary of a block of the time code by the time code allocated to the EFM signal EFM and outputs a block partition pulse signal BP indicating the boundary. Thereby, the block partition pulse signal BP indicates bit boundary of the disk identifying code SB, mentioned above, and is outputted by a 98 frame period by a standard of a compact disk.

An M series generating circuit 21A generates an M series signal MA which is a random number of M series with the synchronization detecting signal SY and the block partition pulse signal BP as a reference and outputs the M series signal MA.

That is, according to the M series generating circuit 21A, a synchronization pattern counting circuit 22 clears a count value by the block partition pulse signal BP and successively counts the synchronization detecting signal SY. Here, according to the compact disk, by constituting 1 block by 98 frames, the synchronization pattern counting circuit 22 outputs count values from a value 0 to a value 97 successively recurrently in synchronism with the block partition pulse signals BP.

An initial value generating circuit 23 is constituted by, for example, memory IC and outputs an initial value in accordance with the count value of synchronization pattern counting circuit 22.

An M series calculating circuit 24 is constituted by a number of continuously connected flip flops and exclusive OR and sets the initial values outputted from the initial value generating circuit 23 to these flip flops by timings of the synchronization detecting signal SY. The M series calculating circuit 24 successively transfers content held by these flip flops in synchronism with the channel clock of the EFM signal EFM to thereby generate and output the M series signal MA. Here, the M series signal MA is a random number of M series and is a signal in which logic 1 and logic 0 emerge randomly at an equal probability.

Thereby, the M series generating circuit 21A constitutes binary number coefficient row generating means for outputting a binary number coefficient row by the M series signal MA and initializes the binary number coefficient row at a constant period with the EFM signal EFM as a reference by operation of the synchronization pattern counting circuit 22 and the initial value generating circuit 23.

An M series generating circuit 21B is constituted the same as the M series generating circuit 21A except that the calculating processing in the M series calculating circuit 24 differs and generates an M series signal MB different from the M series signal MA outputted from the M series generating circuit 21A and outputs the M series signal MB.

Exclusive OR circuits 26A and 26B generate exclusive OR signals produced by the M series signal MA and MB generated in this way and the bits b0 and b1 respectively in correspondence with the disk identifying code SB and output the exclusive OR signals.

That is, the exclusive OR circuit 26A outputs the M series signal MA as it is when the bit b0 to which the disk identifying code SB corresponds is logic 0 and outputs the M series signal MA by inverting the signal level when the bit b0 is logic 1. Thereby, the exclusive OR circuit 26A disturbs the lower bit b0 of the disk identifying code SB by the M series signal MA and outputs the lower bit b0. Thereby, the exclusive OR circuit 26A constitutes first disturbing means for generating a first disturbing signal by disturbing the disk identifying code SB which is sub-data by the binary number coefficient row generated by the M series generating circuit 21A.

Similarly, the exclusive OR circuit 26B outputs the M series signal MB as it is when the bit b1 to which the disk identifying code SB corresponds is logic 0 and outputs the M series signal MB by inverting the signal level when the bit b1 is logic 1. Thereby, the exclusive OR circuit 26B disturbs the higher bit b1 of the disk identifying code SB by the M series signal MB and outputs the higher bit b1. Thereby, the exclusive OR circuit 26B constitutes second disturbing means for generating a second disturbing signal by disturbing the disk identifying code SB which is sub-data by the binary coefficient row generated by the M series generating circuit 21B.

A random number generating circuit 27 generates a random number signal (or quasi random number signal) RX by an arbitrary method and outputs the random number signal. A data selector 28 selects and outputs output signals of the exclusive OR circuits 26A and 26B in accordance with the random number signal RX outputted from the random number generating circuit 27. Thereby, the additional modulating circuit 14 further disturbs and multiplexes the two bits b0 and b1 of the disk identifying code SB which have been disturbed respectively by the M series signals MA and MB and generates 1 series of disturbing signal.

A latch 29 latches and outputs an output signal of the data selector 28 at a timing of a rise edge of the EFM signal. Here, according to the disk original exposure apparatus 1, the rise edge of the EFM signal is set to correspond to the timing of start of pit in the compact disk, thereby, the latch 29 latches the output signal of the data selector 28 at the timing of starting to form the pit and holds the output signal during a time period until a successive timing of starting to form the pit.

Figure 3:
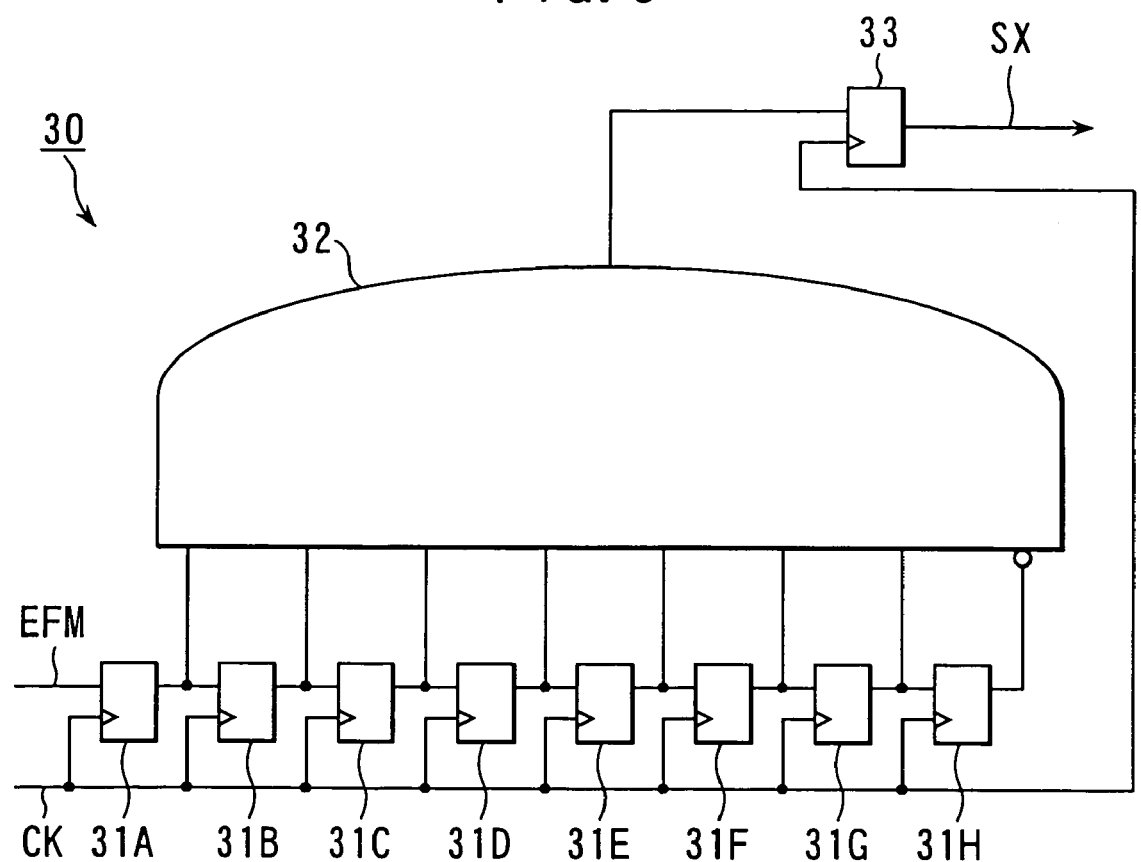
FIG. 3 is a block diagram showing a 7T or more detecting circuit in the additional modulating circuit of FIG. 1.

A 7T or more detecting circuit 30 is constituted as shown by FIG. 3 and detects a time period in which the signal level rises during a time period of a period of 7T or more with respect to a period T of the channel clock in the EFM signal EFM. Thereby, the 7T or more detecting circuit 30 detects a timing of pit formed by a length of a length in correspondence with the period 7T or more on the disk original 2 and outputs a result of the detection as a detecting pulse SX.

That is, the 7T or more detecting circuit 30 inputs the EFM signal EFM to 8 stages of flip flops 31A through 31H which are continuously connected and successively transfers the EFM signal EFM by these flip flops 31A through 31H with the channel clock CK of the EFM signal EFM as a reference. Further, the 7T or more detecting circuit 30 inputs output signals of these flip flops 31A through 31H to AND circuit 32. Here, the 7T or more detecting circuit 30 inverts the signal level of the output signal with respect to the flip flop 31A at the final stage and inputs the inverted output signal to the AND circuit 32.

Thereby, the 7T or more detecting circuit 30 makes the output-signal of the AND circuit 32 rise to logic 1 when the output signal of the flop 31H at the final stage is logic 0 and the output signals of the other flip flop 31A through 31G are logic 1. Thereby, in the case in which the output signal of the AND circuit 32 rises to logic 1 in this way, this is a case in which the rise of the signal level continues during the period of 7T or more after the signal level of the EFM signal EFM has risen, thereby, the timing of forming pit of the period of 7T or more is detected.

The 7T or more detecting circuit 30 latches the output signal of the AND circuit 32 by a latch 33 with the channel clock CK as a reference and outputs the latch result as the detecting pulse SX. Thereby, in the case in which the signal level of the EFM signal EFM rises and the rise of the signal level continues during the period of 7T or more, the detecting pulse SX is outputted such that the signal level rises during the time period of T of 1 period of the channel clock CK.

AND circuit 34 (FIG. 1) generates and outputs AND signal produced by the output signal of the latch 29 and the detecting pulse SX of the 7T or more detecting circuit 30. A monostable multivibrator (MM) 35 is triggered by output signal outputted from the AND circuit 34 and outputs a pulse signal RP the signal level of which rises in accordance with a predetermined pulse width.

A delay circuit 36 outputs the EFM signal EFM after delaying the EFM signal EFM by a predetermined clock number and a subtracting circuit 37 subtracts the output signal RP of the monostable multivibrator 35 from the output signal of the delay circuit 36 and outputs the optical modulating signal SD. Here, according to the delay circuit 36, the EFM signal EFM is delayed such that in the processing at the subtracting circuit 37 in this way, a time period during which the signal level of the pulse signal RP rises, becomes a time period of substantially at center of a time period during which the signal level of the corresponding EFM signal EFM rises.

Further, according to the embodiment, delay time of the delay circuit 36 is set such that the timing at which the signal level of the output signal RP rises, becomes a time point after elapse of a time period of the period 3T from start of the time period of the period 7T or more. Thereby, according to the additional modulating circuit 14, the output signal RP is prevented from effecting influence on reproduction of the audio data SA by the EFM signal EFM in the pit row formed by correcting the signal level of the EFM signal EFM by the output signal RP of the monostable multivibrator 35 in this way.

Figure 4A:
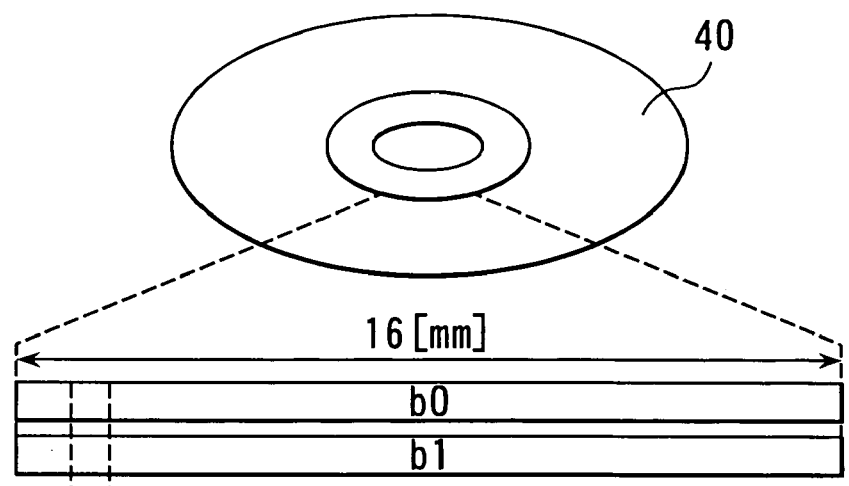
FIGS. 4A to 4C are a perspective view and configuration view showing a compact disk formed by the disk original exposure apparatus of FIG. 2.
Figure 4B:
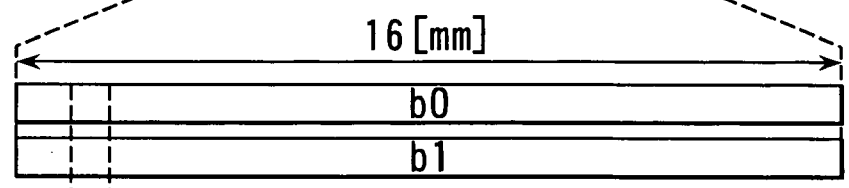
Figure 4C:
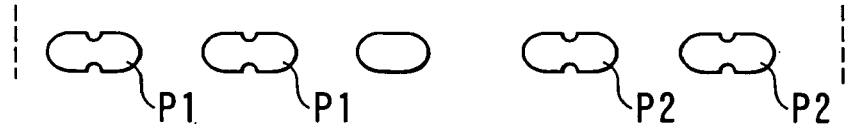

FIGS. 4A to 4C are a perspective view and configuration views showing a compact disk formed by the disk original 2. As described above, according to the optical modulating signal SD, in forming a pit P1 having the period of 7T or more, by making the signal level fall by the pulse signal RP at the timing at substantially center of the pit P1, in the case of a compact disk 40, in the pit P1 having the period of 7T or more, the pit width is formed to be locally narrowed substantially at the central portion of the pit P1 in accordance with the M series signals MA and MB and the disk identifying code SB.

Thereby, in the case of the compact disk 40, the disk identifying code SB is recorded by local change of the pit such that no influence is effected on reproduction of data recorded by the pit row and 1 bit of the disk identifying code SB is recorded by being allocated with an extremely long length such that with regard to a defect having a length by which the audio data which is main data can correctly be reproduced, the disk identifying code which is sub-data can correctly be reproduced.

Further, according to the compact disk 40, 2 bits of the disk identifying code SB are disturbed by the random number signal RX and the respective bit rows are further disturbed by the M series signals MA and MB, thereby, such local change of the pit P1 having the period of 7T or more is irregularly formed, thereby, according to observation by a microscope or the like, record of the disk identifying code SB can easily be discovered. Further, according to observation of a reproduced signal by an oscilloscope or the like, such a local change is observed as noise and therefore, also by waveform analysis of such a reproduced signal, a record of the disk identifying code SB can easily be discovered.

Figure 5:
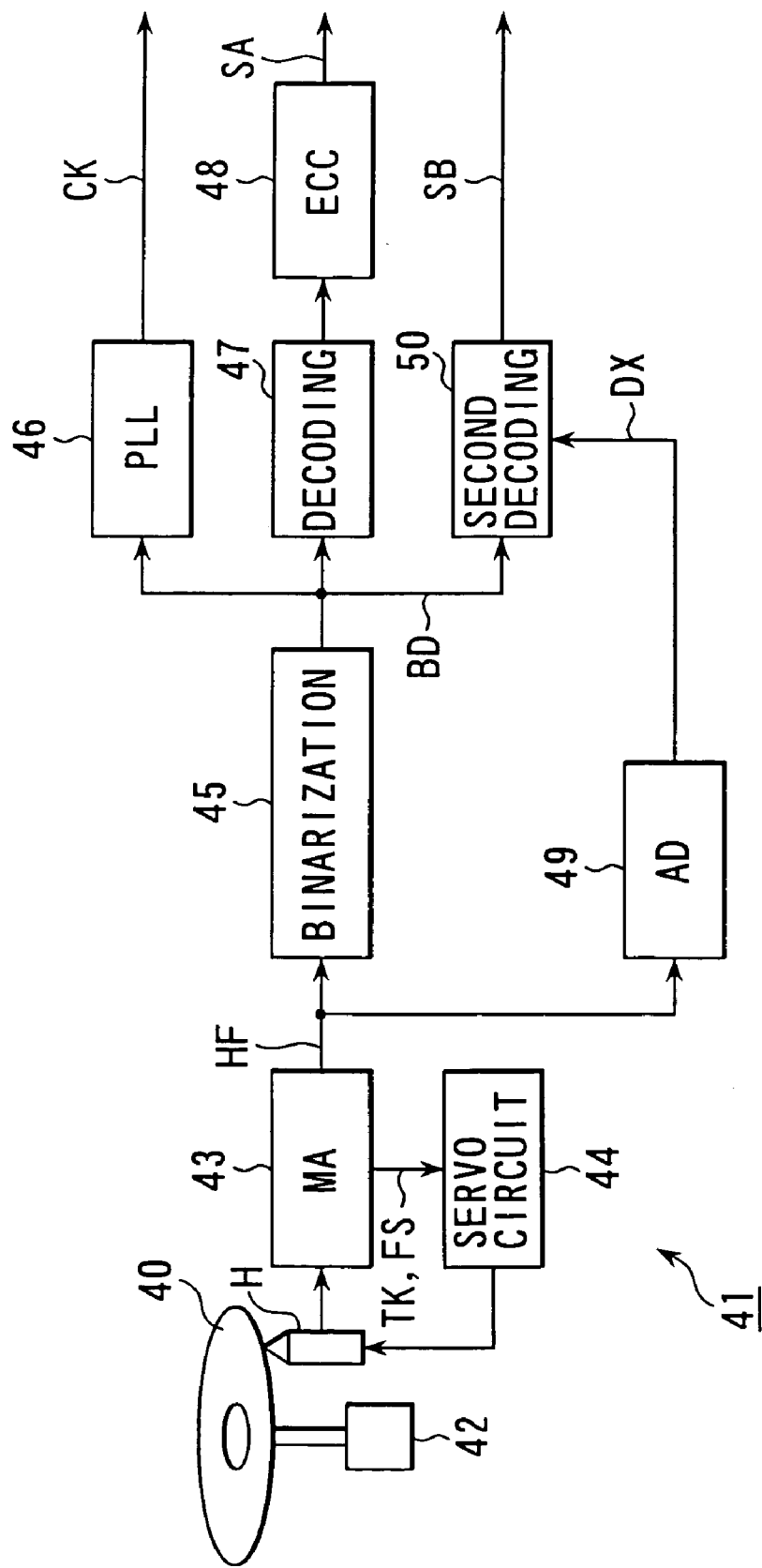
FIG. 5 is a block diagram showing an optical disk reproducing apparatus for reproducing the compact disk of FIGS. 4A to 4C.

FIG. 5 is a block diagram showing an optical disk reproducing apparatus for reproducing the compact disk 40 formed in this way. According to an optical disk reproducing apparatus 41, a spindle motor 42 drives to rotate the compact disk 40 by the condition of constant line speed by control of a spindle servo circuit (not illustrated) with clock provided from the compact disk 40 as a reference.

An optical pickup H irradiates the compact disk 40 with laser beam, receives return beam by a predetermined light receiving element, subjects a light receiving result by the light receiving element to the current/voltage conversion processing and outputs the light receiving result. A matrix circuit (MA) 43 subjects the light receiving result outputted from the optical pickup H to matrix calculation processing and thereby outputs a reproduced signal HF the signal level of which is changed in accordance with a pit row formed at the compact disk 40, a tracking error signal TK the signal level of which is changed in accordance with a tracking error amount and a focus error signal FS the signal level of which is changed in accordance with a focus error amount. Thereby, the optical pickup H and the matrix circuit 43 constitute reproduced signal generating means for receiving the return beam and generating the reproduced signal HF the signal level of which is changed in accordance with the pit row or a mark row.

A servo circuit 44 controls the optical pickup H by tracking control and focus control based on the tracking error signal TK and the focus error signal FS. Further, the optical pickup H is moved in the radius direction of the compact disk 40 by control of a controller, not illustrated, to thereby make the optical pickup H seek.

A binarizing circuit 45 binarizes the reproduced signal HF by predetermined thresholds and outputs a binarized signal BD which is a result of the binarization. A PLL circuit 46 reproduces and outputs the channel clock CK by operating with the binarized signal BD as a reference.

A decoding circuit 47 reproduces and outputs the audio data and the error correction code recorded by the pit row by successively processing the binarized signal BD with the channel clock CK as a reference. An ECC circuit 48 subjects the output data of the decoding circuit 47 to the correction processing and thereby reproduces and outputs the audio data SA recorded by the pit row. Thereby, the binarizing circuit 45, the PLL circuit 46 and the decoding circuit 47 constitute main decoding means for decoding the audio data SA which is main data by identifying the reproduced signal.

An analog/digital conversion circuit (AD) 49 subjects the reproduced signal HF to analog/digital conversion processing with the channel clock CK as a reference and thereby outputs a digital reproduced signal DX comprising 8 bits. Thereby, the analog/digital conversion circuit 49 constitutes sampling means for sampling the reproduced signal HF and outputting the digital reproduced signal DX which is a sampling signal.

A second decoding circuit 50 reproduces and outputs the disk identifying code SB by subjecting the digital reproduced signal DX to signal processing. According to the optical disk reproducing apparatus 41, the reproduced disk identifying code SB serves to protect the copyright owner. Thereby, the second decoding circuit 50 constitutes sub decoding means for reproducing sub-data recorded by local change of pit or mark of the pit row or the mark row by repeating to integrate the sampling signal generated by the analog/digital conversion circuit 49 in a predetermined time period.

Figure 6:
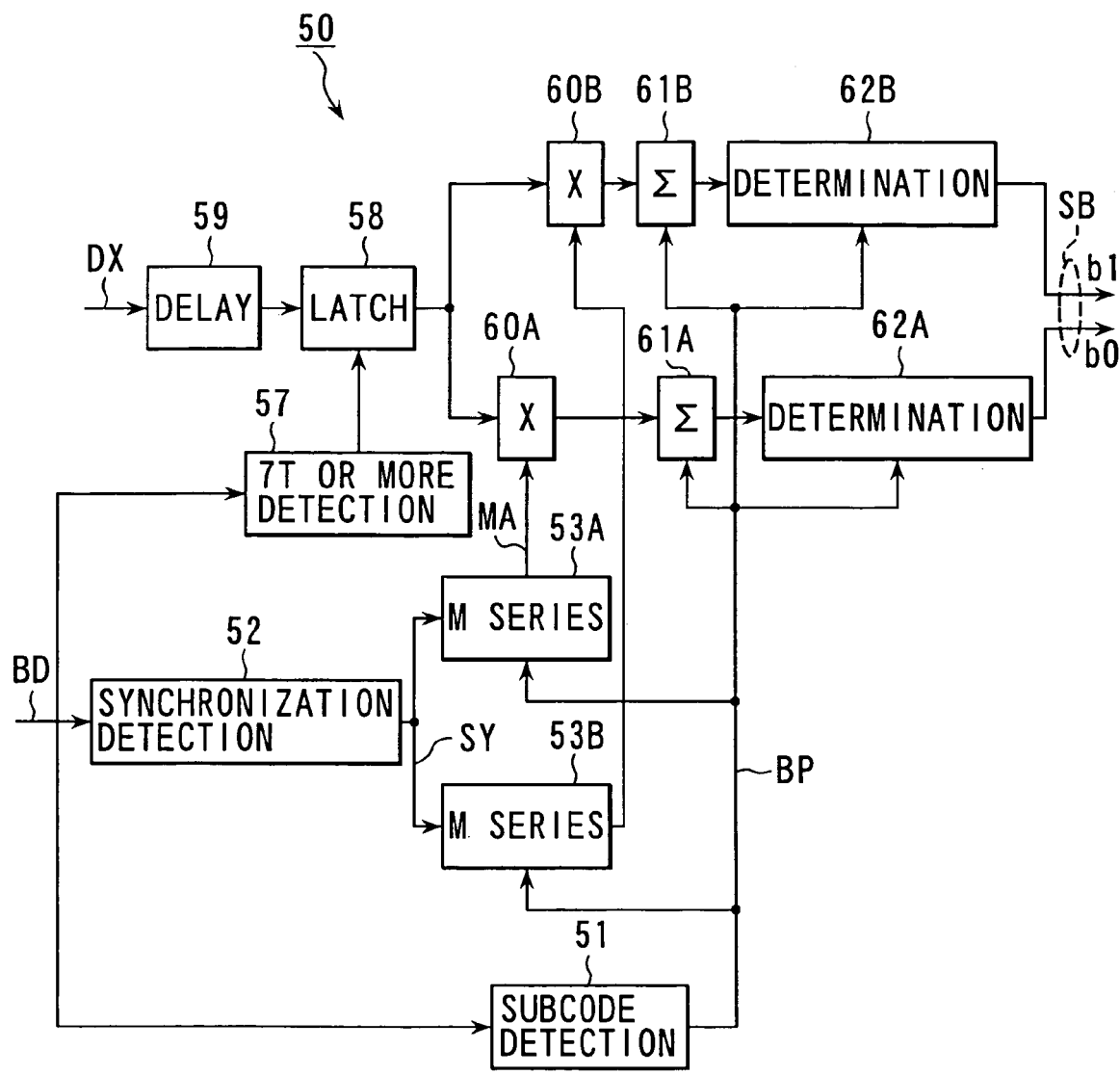
FIG. 6 is a block diagram showing a second decoding circuit of the optical disk reproducing apparatus of FIG. 5.

FIG. 6 is a block diagram showing the second decoding circuit 50. According to the second decoding circuit 50, a sub code detecting circuit 51 latches and processes the binarized signal BD by the channel clock CK and thereby detects sub code data by the binarized signal BD. Further, the sub code detecting circuit 51 detects a block boundary of a time code from the detected sub code data and outputs the block partition pulse signal BP indicating the boundary. Thereby, the block partition pulse signal BP indicates a bit boundary of the disk identifying code SB included in the reproduced signal HF.

A synchronization detecting circuit 52 detects a synchronizing signal from the binarized signal BD by successively latching the binarized signal BD by the channel clock CK and determining a logical level thereof. Further, the synchronization detecting circuit 52 outputs a synchronization detecting signal SY indicating a frame boundary of the binarized signal BD from a result of the detection.

Figure 7:
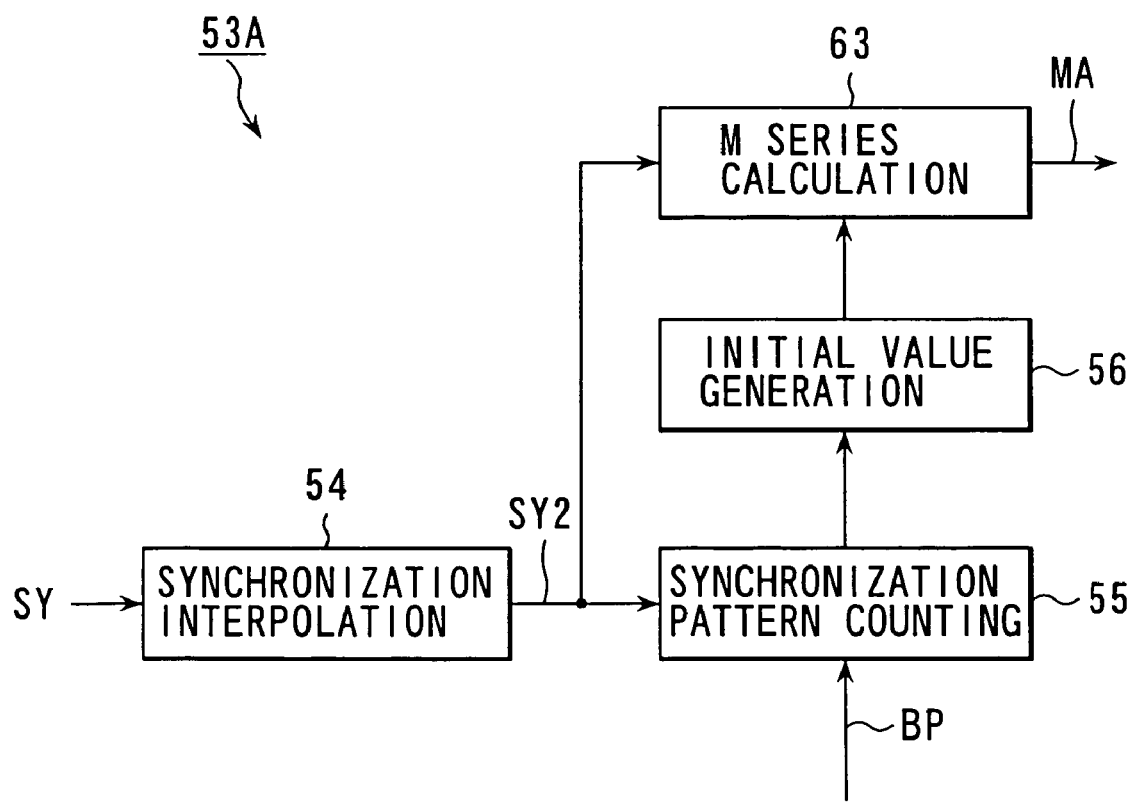
FIG. 7 is a block diagram showing an M series generating circuit of the second decoding circuit of FIG. 6.

M series generating circuits (M series) 53A and 53B respectively generate and output M series signals MA and MB the same as those used in disturbing the disk identifying code SB in recording operation. That is, as shown in FIG. 7, according to the M series generating circuit A, a synchronization interpolating circuit 54 counts the channel clock CK with the synchronization detecting signal SY as a reference and thereby generates and outputs a synchronization detecting signal SY2 correctly indicating the frame boundary in the binarized signal BD even in the case in which the synchronization detecting signal SY is not detected by a defect or the like by counting the channel clock CK with the synchronization detecting signal SY as a reference.

Thereby, according to the compact disk, by setting 1 frame which is an inserted period of the synchronization detecting signal SY to 588 channel clocks, the synchronization interpolating circuit 54 generates the synchronization detecting signal SY2 by utilizing the relationship and thereby outputs the synchronization detecting signal SY2 indicating correctly the frame boundary even in the case in which the synchronization detecting signal SY is not detected by a defect or the like, in the case in which the synchronization detecting signal SY is erroneously detected or the like.

A synchronization pattern counting circuit 55 clears a count value by the block partition pulse signal BP and successively counts the synchronization detecting signal SY. Here, according to the compact disk, 1 block is constituted by 98 frames and accordingly, the synchronization pattern counting circuit 55 repeatedly outputs a count value from value 0 through value 97 at the period of the block partition pulse signal BP similar to the synchronization pattern counting circuit 22 (FIG. 1) in recording operation.

An initial value generating circuit 56 is constituted by, for example, memory IC, holds content the same as that of the initial value generating circuit 23 on the recording side and outputs an initial value in accordance with a count value of the synchronization pattern counting circuit 55.

An M series calculating circuit 63 is constituted the same as the M series calculating circuit 24 on the recording side by a number of flip flops and exclusive OR which are continuously connected and sets the initial value outputted from the initial value generating circuit 56 to these flip flops at the timings of the synchronization detecting circuit SY. The M series calculating circuit 63 successively transfers content held in these flip flops in synchronism with the channel clock CK and thereby generates and outputs M series signal MA the same as that generated in recording operation.

Thereby, when the M series signal MA is generated by carrying out initialization by the frame period in this way, the M series signal MA can be initialized by correct timing even in the case in which the PLL circuit 46 is erroneously operated by, for example, a defect of about 1 (mm) of the compact disk 40 and as a result, bit slip is caused in the channel clock CK, thereby, with the M series signal MA as a reference, the disk identifying code SB is decoded and a correct decoded result can be provided.

Further, the M series generating circuit 53B corresponds to the M series generating circuit 21B in recording operation and is constituted the same as the M series generating circuit 53A except that calculating operation in the M series calculating circuit 63 differs and accordingly, a detailed explanation thereof will be omitted here.

A 7T or more detecting circuit 57 corresponds to the 7T or more detecting circuit 30 on the recording side and outputs a latch signal the signal level of which rises only during a time period of 1 channel clock period T in a pit of the period of 7T or more allocated with the disk identifying code SB by determining a continuous signal level of the binarized signal BD with the channel clock CK as a reference. Thereby, the 7T or more detecting circuit 57 is constituted the same as the 7T or more detecting circuit 30 explained in reference to FIG. 3 except that the binarized signal BD is successively transferred in place of the EFM signal EFM.

A latch 58 latches the digital reproduced signal DX inputted via a delay circuit 59 with a latch signal as a reference and the delay circuit 59 delays the digital reproduced signal DX by a predetermined time period such that a latch timing by the latch 58 becomes a timing of locally changing the pit width in a pit having the period of 7T or more.

A multiplying circuit (X) 60A switches polarity of a latch result outputted from the latch 58 in accordance with the logical level of the M series signal MA generated by the M series generating circuit 53A and outputs thereof. Here, the local change of the pit width in the recording operation is formed by further disturbing the bits b0 and b1 which have respectively been disturbed by the M series signals MA and MB by the random number signal RX, thereby, according to an output signal from the multiplying circuit 60A, a signal produced by disturbing the bit b0 by the M series signal MA and a signal produced by disturbing the bit b1 by the M series signal MB, are mixed.

Among them, according to a first multiplied value to which the bit b0 and the M series signal MA are correctly reflected the bit b0 is multiplied by the M series signal MA with a time period during which 1 bit of the disk identifying code SB is being allocated as a unit and is accumulatedly added, thereby, the first multiplied value converges to a constant value in correspondence with the logical level of the bit b0. According to the embodiment, the M series signal MA is multiplied by switching the polarity of the latch result outputted from the latch 58 in accordance with the logical level of the M series MA and an accumulated addition result is subjected to binary value identification with the value 0 as a reference to thereby correctly decode the bit b0.

In contrast thereto, according to the signal produced by disturbing the bit b1 by the M series signal MA, since the M series signal MA and MB are random numbers in which logic 1 and logic 0 are generated at equal probability, the signal gradually converges to the value 0 by multiplying the bit b1 by the M series signal MA and accumulatedly adding the multiplied result during a constant time period. That is, according to the embodiment, by switching the polarity of the latch result outputted from the latch 58 in accordance with the logical level of the M series signal MA, information of the bit b1 converges to the value 0 by the accumulated addition for the constant time period.

Thereby, according to the output signal of the multiplying circuit 60A in which a first and a second multiplied value are repeated in accordance with the random number signal RX, after accumulated addition with the time period during which the disk identifying code SB of 1 bit is being allocated, the lower bit b0 can correctly be decoded by being subjected to binary value identification with the value 0 as a reference.

Thereby, an accumulated addition circuit 61A outputs a result of accumulated addition representing the logical level of the bit b0 by subjecting the multiplied result of the multiplying circuit 60A to accumulated addition by the period of the block partition signal BP and a determining circuit 62A subjects a result of accumulated addition of the accumulated addition circuit 61A to binary value identification in accordance with 0 level with the block partitioning signal BP as a reference and thereby decodes and outputs the lower side bit b0 of the disk identifying code SB.

Similar to such processing on the side of the M series signal MA, a multiplying circuit (X) 60B switches the polarity of the latch result outputted from the latch 58 in accordance with a logical level of the M series signal MB generated by the M series generating circuit 53B and outputs the latch result. Here, according to an output signal from the multiplying circuit 60B provided in this way, a product of the M series signal MB and the latch result is calculated.

Thereby, an accumulated addition circuit 61B subjects a multiplied result of the multiplying circuit 60B to accumulated addition at the period of the block partition signal BP and thereby outputs a result of the accumulated addition representing the logical level of the bit b1 and a determining circuit 62B subjects a result of accumulated addition of the 0 level accumulated addition circuit 61B with the block partition signal BP as a reference to thereby record and output the higher side bit b1 of the disk identifying code SB.

(2) Operation of Embodiment

In the above-described constitution, in the steps of fabricating the compact disk 40 according to the embodiment, in the disk original exposure apparatus 1 (FIG. 2), in accordance with the audio data SA outputted from the signal source 3 which is a digital audio tape recorder, the disk original 2 is successively exposed, the mother disk is formed and thereafter, the compact disk 40 is formed from the mother disk.

In exposing the disk original 2, the audio data SA is converted into the EFM signal EFM by executing the processing of adding the error correction code in the ECC circuit 11 and thereafter adding the sub code data SC at the successive EFM circuit 13. Further, the EFM signal EFM is converted into the drive signal SD at the additional modulating circuit 14 and is recorded on the disk original 2 by driving the optical modulator 7 by the drive signal SD. Thereby, the audio data SA is recorded on the disk original 2 by a repetition of pits and spaces in accordance with lengths produced by multiplying a basic length in correspondence with one period of the channel clock CK by integers.

In converting the EFM signal EFM into the drive signal SD, the EFM signal EFM is converted into the drive signal SD by locally switching the signal level, thereby, in a pit row formed on the disk original 2, there is formed a pit having a locally narrow width. Thereby, the pit width is modulated and the sub-data SB by the disk identifying code is recorded on the disk original 2.

That is, according to the disk original exposure apparatus 1, the disk identifying code SB of 2 bits comprising the lower bit b0 and the upper bit b1 is outputted and the EFM signal EFM is modulated by the additional modulating circuit 14 in accordance with the disk identifying code SB to thereby generate the drive signal SD.

At this occasion, the disk identifying code SB is outputted based on the time code allocated to the sub code data SC by a long bit period in which 1 block period of the time code in the sub code data SC constitutes a repetition period of the disk identifying code SB, thereby, 1 bit is allocated and recorded in an area having a track length of 16 (mm) in the compact disk 40.

The length of 16 (mm) is a length by which the disk identifying code SB can correctly be reproduced in the case in which the audio data SA which is main data can correctly be reproduced by the error correction code and in the case in which the audio data SA which is the main data can correctly be reproduced to a degree of maintaining commercial value as the compact disk, thereby, the disk identifying code SB can correctly be reproduced without repeatedly recording thereof.

Further, the length of 16 (mm) is a length by which when a defect to a degree which is difficult to correctly reproduce the disk identifying code SB is caused, the defect can sufficiently be detected by optical observation, thereby, the defect by which the disk identifying code SB is difficult to reproduce correctly can simply be discovered by optical inspection.

Further specifically, according to the disk original exposure apparatus 1 (FIG. 1), there are formed two kinds of the M series signals MA and MB which are binary coefficient rows by the M series generating circuits 21A and 21B and in the exclusive OR circuits 26A and 26B, the lower bit b0 and the upper bit b1 of the disk identifying code SB are disturbed respectively by the M series signals MA and MB and thereafter, multiplexed by the data selector 28. Further, in the 7T or more detecting circuit 30 of the additional modulating circuit 14, a timing in correspondence with a pit having a period of 7T or more is detected from the EFM signal EFM and based on a result of detecting the timing, the signal level of the EFM signal EFM is made to fall by the signal multiplexed by the data selector 28 by the subtracting circuit 37 at a timing in correspondence with substantial center of the pit having the period of 7T or more. Thereby, the disk identifying code SB is allocated with 1 bit in the track having the length 16 (mm), dispersed within the range of 16 (mm) and recorded by changing a substantially central portion of the pit having the period of 7T or more formed in the range.

With regard to the pit having such a long period, when the pit width of the substantially central portion is changed, according to the compact disk 40, distances from a pit start position and a pit finish position to the portion where the pit width is changed, is substantially equal to or larger than a beam diameter of laser beam irradiated in reproducing operation. Thereby, according to the compact disk 40, even when the pit is locally changed in this way, with regard to a timing at which a reproduced signal traverses a slice level of binarization, the pit can be constituted such that nothing changes, thereby, the disk identifying code SB can be recorded to multiplex such that no influence is effected on reproduction of audio data which is main data recorded by the pit row.

Thereby, according to the disk identifying code SB recorded in this way, by disturbing and multiplexing the disk identifying code SB by the two kinds of the M series signals MA and MB, the disk identifying code SB is formed irregularly by continuous pits in the local change formed by the pit having the period of 7T or more in this way. Thereby, the disk identifying code SB can be made significantly difficult to discover or detect by observation by a microscope or the like and by waveform analysis or the like of a reproduced signal.

Further, by carrying out the multiplexing processing by selecting two series of disturbing signals with the random number signal RX generated by the random number generating circuit 27 as a reference, the local change formed in pits can be set significantly irregularly by continuous pits also thereby. Therefore, the record of sub-data of this kind can be made further difficult to discover or detect by that amount.

Thereby, on the reproduction side, irregular copy can effectively be excluded based on a result of detecting the disk identifying code such that right of the copyright owner is protected.

Further, it is difficult to copy the locality of such a pit shape by a general method of forming illegal copy and therefore, illegal copy can effectively be excluded also thereby.

Particularly, according to the embodiment, by allocating the track length of 16 [mm] to 1 pit of the disk identifying code SB, and by being capable of setting a time period of making the signal level of the EFM signal EFM fall by the monostable multivibrator 35, the disk identifying code SB can be reproduced with certainty while significantly reducing deformation of a signal pit and the disk identifying code can be made difficult to discover or detect and difficult to copy also thereby.

In recording the disk identifying code SB by disturbing the M series signals MA and MB in this way, according to the additional modulating circuit 14, in the synchronization detecting circuit 20, the frame boundary and the block boundary of the time code are detected by the EFM signal EFM. Further, the initial value is set to the M series calculating circuit 24 by a unit of the frame by the initial value generating circuit 23 with the results of detection as a reference, thereby the M series signals MA and MB are initialized by a period of the frame.

Thereby, on the reproduction side, in generating similar M series signals MA and MB in reproducing the disk identifying code SB recorded by disturbing thereof in this way, even in the case in which an error of so-to-speak bit slip or the like is caused in the channel clock, an influence by the error can be repaired in a short period of time. Thereby, the disk identifying code recorded to be difficult to discover or detect can be reproduced with certainty.

That is, according to the compact disk 40 formed from the disk original 2, in the optical disk reproducing apparatus 41 (FIG. 5), return beam provided by irradiating laser beam is received and reproduced signal HF the signal level of which is changed in accordance with the pit row is generated. According to the optical disk reproducing apparatus 41, the reproduced signal HF is binarized, the channel clock CK is reproduced and the audio data SA is reproduced by processing of the decoding circuit 47 and the ECC circuit 48 with the channel clock CK as the reference.

At this occasion, according to the compact disk 40, since the local change of pit is formed by a pit having the period 7T or more and at substantially central portion of the pit, a beam spot by the laser beam scans edges of the pit and the location where the pit width is changed by different timings, thereby, in the reproduced signal HF, an influence effected by reducing the pit width locally can be avoided. That is, according to the compact disk 40, a change of the signal level at a vicinity of the respective edge produced by changing the pit is prevented, thereby, the audio data SA can be reproduced by a processing the same as that of a normal compact disk player.

According to the optical disk reproducing apparatus 41, further in the analog/digital conversion circuit 49, the reproduced signal HF is sampled at the period of the channel clock CK to thereby generate the digital reproduced signal DX and the digital reproduced signal DX is processed by the second decoding circuit 50 to thereby reproduce the disk identifying code SB. According to the optical disk reproducing apparatus 41, based on a result of reproducing the disk identifying code SB, for example, the processing of the audio data SA is switched, thereby, right of the copyright owner can effectively be protected.

In the processing at the second decoding circuit 50 (FIG. 6), in the 7T or more detecting circuit 57, by monitoring the signal level of the continuous binarized signal BD with the channel clock CK as the reference, similar to detection on the recording side, a timing in correspondence with a pit having the period of 7T or more is detected. Further, based on a result of the detection, the digital reproducing signal DX is latched to the latch 58, thereby, the digital reproducing signal DX is selectively inputted with regard to a timing of superposing the disk identifying code SB.

Further, in the synchronization detecting circuit 52, the frame boundary and the block boundary are detected from the binarizing signal BD and in the M series generating circuits 53A and 53B, the M series signals MA and MB similar to those in the recording operation are generated based on results of detecting the frame boundary and the block boundary. Further, by two kinds of the M series signals MA and MB, there are provided product sum calculating results with the digital reproduced signals DX respectively inputted to the latch 58 selectively and the product sum calculating results are determined by the determining circuits 62A and 62B.

According to the optical disk reproducing apparatus 41, at every length of 16 (mm) allocated with 1 bit of the disk identifying code SB, the processing is repeated, thereby, the disk identifying code SB is decoded. Thereby, the product sum calculating results of the local change of the pit provided from the range of 16 (mm) in this way, are provided with a value sufficiently larger than that of random noise mixed in the reproduced signal HF. Therefore, even when the change amount at the respective pit is set to extremely small deformation amount, the change amount can be reproduced with certainty.

Further, in the reproducing operation, by calculating the product sum calculating results by respectively using the M series signals MA and MB, even when the disturbing signals of the lower bit b0 and the higher bit b1 in correspondence with the M series signals MA and MB are multiplexed by irregular arrangements and a reference of decoding multiplex formation of these is not transferred from the recording side to the reproducing side, the lower bit b0 and the higher bit b1 can be decoded correctly. Therefore, the disk identifying code is made difficult to discover and yet can be reproduced with certainty also thereby.

In this way, the M series signals MA and MB used in decoding the disk identifying code SB are respectively made to correspond to those in recording operation and are initialized by the period of frame in the M series generating circuits 53A and 53B. Thereby, according to the optical disk reproducing apparatus 41, even in the case in which the reproduced signal HF is interrupted by a defect of the compact disk 40 or the like to thereby produce so-to-speak bit slip, the M series signals MA and MB can be corrected swiftly and erroneous detection of the disk identifying code SB can be prevented by that amount.

(3) Effect of Embodiment

According to the above-described constitution, with regard to a defect having a size by which at least the audio data SA which is the main data can be reproduced correctly, by recording the disk identifying code SB which is the sub-data such that the disk identifying code SB can be reproduced correctly by allocating 1 bit of the disk identifying code SB to a pit row having a predetermined length or more, in the case in which the disk identifying code is recorded by partial change of the pit shape, the disk identifying code can be reproduced with certainty without repeatedly recording the disk identifying code. Further, by allocating 1 bit in a long range, local change of the pit shape can be reduced, thereby, the disk identifying code SB can be made difficult to discover, further, formation of copy can be prevented, thereby, illegal copy can effectively be prevented.

Further, in the case in which there causes a defect which makes 1 bit of the disk identifying code SB difficult to reproduce, since the length of allocating the 1 bit of the disk identifying code SB is the length by which the defect can be detected by optical observation, a compact disk in which the disk identifying code SB cannot be reproduced correctly can be discovered simply and quality of the compact disk can be promoted by that amount.

Further, by disturbing and recording the disk identifying code SB by the M series signals MA and MB which are binary coefficient rows, local change formed in a pit can be made difficult to discover or detect and illegal copy can be prevented also thereby.

Further, the binary coefficient row is the binary coefficient row of M series and accordingly, the binary coefficient row of this kind can be formed simply.

Further, respective bits of the disk identifying code are disturbed respectively by two series of the M series signals MA and MB and thereafter the respective bits are multiplexed and recorded by local change of the pit shape, also thereby, the disk identifying code can be made difficult to detect.

Further, by executing the multiplexing processing by selection using random number, the disk identifying code can further be made difficult to detect.

Further, by initializing the M series signals MA and MB by the frame period, erroneous detection of the disk identifying code SB by bit slip or the like can be prevented.

Thereby, by constituting the reproduction side to correspond with these constitutions, illegal copy can effectively be prevented and right of the copyright owner can effectively be protected.

(4) Other Embodiments

Further, although according to the above-described embodiment, a description has been given of the case in which 1 bit of the disk identifying code which is the sub-data is allocated to the length of 16 (mm), the present invention is not limited thereto but the length of allocating the 1 bit can be set to various length as necessary. Further, after various investigation, it is found that influence of a defect can be avoided practically sufficiently by allocating 1 bit of the disk identifying code to a length of 1 (mm) or more although depending on to what degree an error rate of the disk identifying code is allowed.

Further, although according to the above-described embodiment, a description has been given of the case in which after disturbing the disk identifying code by the binary coefficient row, the disk identifying code is further disturbed by random number and is multiplexed, the present invention is not limited thereto but after disturbing the disk identifying code by the binary coefficient row, the disk identifying code may be selected simply alternately and multiplexed, further, respective disturbing signals may be multiplexed by allocating the disturbing signals respectively to pits having predetermined lengths.

Further, although according to the above-described embodiments, a description has been given of the case in which 2 bits of the disk identifying code are multiplexed and recorded, the present invention is not limited thereto but a number of bits to be multiplexed can be set variously, further, serial data may be recorded by 1 bit by omitting multiplexing processing.

Further, although according to the above-described embodiment, a description has been given of the case in which with regard to a pit having the period of 7T or more, the pit width is modulated and the disk identifying code is recorded, the present invention is not limited thereto but when a reproducing system can ensure sufficient allowance with regard to jitter of a reproduced signal, a pit the shape of which is to be changed can be selected variously as necessary as in the case in which the pit shape is changed with regard to a pit having the period of 6T or more, the case in which the pit shape is changed only with regard to a pit having a predetermined length or the like.

Further, although according to the above-described embodiment, a description has been given of the case in which the pit shape is changed by temporarily controlling laser beam to OFF by making the signal level of the EFM signal fall locally, the present invention is not limited thereto but, for example, the pit shape can be changed by changing an optical amount of laser beam. Thereby, the pit shape can also be changed such that the pit width is increased locally and the disk identifying code can also be decoded by three values by a local increase in the pit width and a reduction in the pit width. Further, the disk identifying code can also be recorded by recording of multiple values higher than three values by setting a degree of the increase and a degree of the reduction in steps.

Further, although according to the above-described embodiment, a description has been given of the case in which the disk identifying code is recorded by change of the pit shape, the present invention is not limited thereto but various data is applicable to data recorded by change of the pit shape. That is, for example, the main data may be ciphered and recorded by a pit row and data necessary for deciphering thereof may be recorded by change of the pit shape, thereby, right of the copyright owner can further be protected effectively.

Further, although according to the above-described embodiment, a description has been given of the case in which the sub-data is recorded simultaneously and in parallel with the main data row by a pit row, the present invention is not limited thereto but the sub-data may be recorded only to a specific area of a compact disk. Further, in this case, there is conceivable the case in which the sub-data is recorded at, for example, read-in area. Further, in these cases, the pit width is changed also in an area in which the sub-data is not recorded at all, thereby, an area recorded with the sub-data may be made difficult to discover.

Further, although according to the above-described embodiment, a description has been given of the case in which the product sum calculation result is determined by the determining circuit and the disk identifying code is reproduced, the present invention is not limited thereto but, for example, Viterbi decoding or the like or various identifying methods can be applied widely.

Further, although according to the above-described embodiment, a digital audio signal is recorded by carrying out EFM modulation, the present invention is not limited thereto but is widely applicable to various modulations such as 1–7 modulation, 8–16 modulation, 2–7 modulation and the like.

Further, although according to the above-described embodiment, a description has been given of the case in which desired data is recorded by a pit row, the present invention is not limited thereto but is widely applicable also to the case in which desired data is recorded by a mark row.

Further, although according to the above-described embodiment, a description has been given of the case in which the disk original is exposed by irradiating laser beam, the present invention is not limited thereto but, for example, widely applicable to the case in which the desired data is recorded by irradiating electron beam.

Further, although according to the above-described embodiment, a description has been given of the case in which the audio data is recorded by applying the present invention to a compact disk and peripheral apparatus thereof, the present invention is not limited thereto but is widely applicable to various optical disks and peripheral apparatus thereof such as a video disk and the like.

Further, although according to the above-described embodiment, a description has been given of the case in which the present invention is applied to an optical disk system, the present invention is not limited thereto but is widely applicable to an information recording medium in a card-like shape formed with information recording faces similar to those in an optical disk and peripheral apparatus of the information recording medium and so on.

What is claimed is:

1. A process for manufacturing an optical disk, comprising:
    (a) preparing an original master disk, comprising:
    (a1) generating a second modulating signal corresponding to a disk identifying code by modulating a first modulating signal in correspondence with a pit row or a mark row by sub-data in accordance with a logical level of the sub-data such that a pit or a mark of the pit row or the mark row is locally changed; and
    (a2) modulating a beam for recording by the second modulating signal and irradiating an original master disk with the modulated beam for recording,
    wherein the second modulating signal is generated by allocating one bit of the sub-data to an area of the pit row or the mark row including plural pits or marks, the pit row or the mark row having a minimum predetermined length to which one bit of the sub-data is allocated that is long enough such that the pit row or mark row can be observed by an optical inspection;
    (b) forming a stamper from the master disk; and
    (c) forming a disk substrate by the stamper.

2. A process for manufacturing an optical disk according to claim 1, wherein the predetermined minimum length is a length of 1 mm or more.

3. A process for manufacturing an optical disk according to claim 1, wherein the predetermined minimum length is a length by which the area to which one bit of the sub-data is allocated can be detected by visual observation.

4. A process for manufacturing an optical disk according to claim 1, wherein the local change is formed in accordance with a disturbing signal disturbing the sub-data by a binary coefficient row.

5. A process for manufacturing an optical disk according to claim 4, wherein the binary coefficient row is a binary coefficient row of M series.

6. A process for manufacturing an optical disk according to claim 4, wherein the binary coefficient row comprises at least a first and a second one of the binary coefficient rows and the disturbing signal is generated by multiplexing a first and a second one of the disturbing signals generated by disturbing a first and a second one of the pit rows by the sub-data by the first and the second ones of binary coefficient rows.

7. A process for manufacturing an optical disk according to claim 6, wherein the first and second ones of disturbing signals are selected in accordance with a predetermined random number to thereby generate the disturbing signal.

8. A process for manufacturing an optical disk according to claim claim 4, wherein the binary coefficient row is initialized at a constant period with the pit row or the mark row as a reference.

9. A process for manufacturing an optical disk according to claim 1, wherein the main data is ciphered and recorded and the sub-data is data necessary for deciphering the main data.

* * * * *